United States Patent [19]

Ishii

[11] Patent Number: 4,941,370
[45] Date of Patent: Jul. 17, 1990

[54] SELECT SHOCK ATTENUATION ARRANGEMENT FOR AUTOMATIC AUTOMOTIVE TRANSMISSION

[75] Inventor: Yoshihiko Ishii, Fuji, Japan

[73] Assignee: Nissan Motor Co., Ltd., Yokohama, Japan

[21] Appl. No.: 216,569

[22] Filed: Jun. 23, 1988

[51] Int. Cl.$^5$ .............................................. B60K 41/10
[52] U.S. Cl. ..................................... 475/128; 74/867; 192/48.7
[58] Field of Search ................. 192/48.7, 87.11, 70.21; 74/752 C, 867

[56] References Cited

U.S. PATENT DOCUMENTS

| | | | |
|---|---|---|---|
| 3,679,033 | 7/1972 | Wagner | 192/48.7 |
| 4,225,029 | 9/1980 | Ushijima | 192/12 C |
| 4,561,528 | 12/1985 | Sugano | 192/0.052 |
| 4,602,529 | 7/1986 | Sugano | 74/869 |
| 4,665,774 | 5/1987 | Oguri | 192/48.7 |
| 4,709,597 | 12/1987 | Yasue et al. | 74/752 C |
| 4,765,202 | 8/1988 | Hayasaki | 74/752 C |
| 4,858,501 | 8/1989 | King | 74/867 |

FOREIGN PATENT DOCUMENTS 0860688 8/1981 U.S.S.R. .............................. 192/48.7

OTHER PUBLICATIONS

Nissan Motor Automatic Transaxle RN 4FO2A and RL4F02A (A261C06); 1984; pp. 44 and 56; Nissan Motor Co., Ltd.

Primary Examiner—Leslie A. Braun
Assistant Examiner—Harold F. Macris
Attorney, Agent, or Firm—Foley & Lardner, Schwartz, Jeffrey, Schwaab, Mack, Blumenthal & Evans

[57] ABSTRACT

A sequence valve is interposed between the manual valve and the reverse clutch and arranged to control the communication therebetween. The valve is responsive to the pressure which develops in the low and reverse brake and establishes communication between the manual valve and the reverse clutch when the pressure prevailing in the low and reverse brake is such as to indicate that the brake is engaged to a predetermined degree.

6 Claims, 2 Drawing Sheets

SELECT SHOCK ATTENUATION ARRANGEMENT FOR AUTOMATIC AUTOMOTIVE TRANSMISSION

BACKGROUND OF THE INVENTION

1. Field of the Invention

The present invention relates to an automatic automotive transmission and more specifically to such a transmission which includes an arrangement for attenuating select shock when the transmission is conditioned to produce reverse gear 2. Description of the Prior Art Nissan Motor Automatic Transaxle RN4FO2A and RL4FO2A (A261C06) discloses on pages 55 and 56 an arrangement wherein a reverse clutch (or rear clutch as it is sometimes referred to) and a low and reverse brake are arranged in the manner shown in FIG. 1. This arrangement however, has suffered from the drawback that, due to the difference in stroke lengths of the two friction elements and the length and the flow resistance of the conduits associated therewith, the reverse clutch engages before the low and reverse brake. This results in a two stage or double select shock being produced.

That is to say, when the reverse clutch is engaged the input shaft becomes connected with the sun gear of the left-hand or first planetary gear unit 101 (as seen in the drawings). However, as the carrier 102 of the gear unit 101 is not braked at this time it tends also to rotate. The inertia of these elements produces a first shock. Following this, the engagement of the low and reverse brake stops the rotation of the carrier 102 of the planetary gear unit 101 which is induced by the prior engagement of the reverse clutch and induces a second inertia related shock.

SUMMARY OF THE INVENTION

It is an object of the present invention to improve the reverse gear (R range) select operation in the above type of transmission in a manner which eliminates the double select shock phenomenon experienced in the above mentioned type of transmission.

In brief, the above object is achieved by an arrangement wherein a sequence valve is interposed between the manual valve and the reverse clutch and arranged to control the communication therebetween. The valve is responsive to the pressure which develops in the low and reverse brake and establishes communication between the manual valve and the reverse clutch when the pressure prevailing in the low and reverse brake is such as to indicate that the brake is engaged to a predetermined degree.

More specifically, the present invention is deemed to comprise a transmission which features: a first hydraulically operated friction element; a second hydraulically operated friction element; a source of hydraulic pressure; a first valve interposed between the first and second friction elements, the first valve being selectively conditionable to supply hydraulic pressure to the first and second friction elements; a sequence valve interposed between the second friction element and the first valve, the sequence valve being responsive to the level of pressure which is supplied to the first friction element in a manner wherein until the pressure supplied to the friction element reaches a predetermined level the sequence valve assumes a condition wherein hydraulic pressure is cut-off from the second friction element.

DETAILED DESCRIPTION OF THE PREFERRED EMBODIMENT

Figure 2:
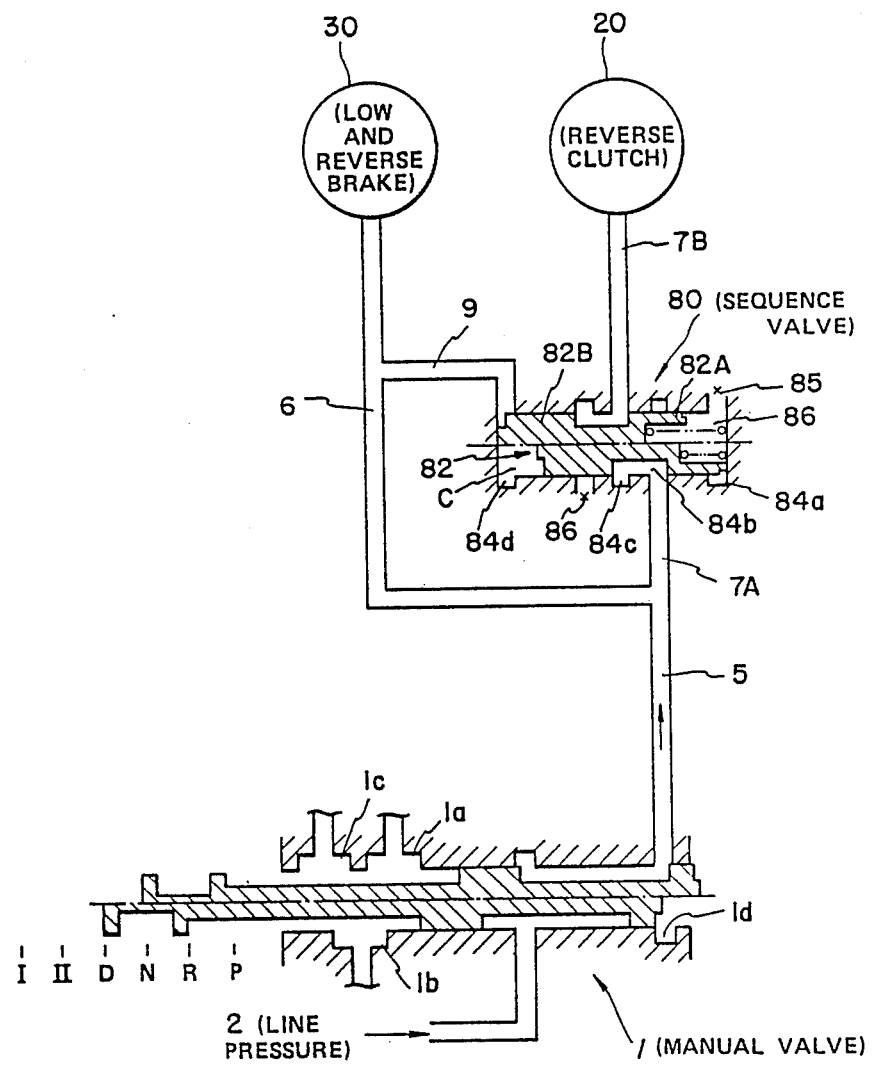
FIG. 2 shows a sequence valve which is provided between the low and reverse brake and the reverse clutch, and which in accordance with the present invention, induces an engagement timing which improves the R range select operation.

FIG. 2 shows an embodiment of the present invention. In this arrangement a manual selector valve or manual valve 1 as it will be referred to hereinafter is circuited with a source of line pressure via conduit 2. In this instance the manual valve 1 is such that it can be set in anyone of P, R, N, D II and I ranges.

When this valve is in either of P and N ranges line pressure is not supplied therethrough to any of the ports 1a–1d and under these conditions all of the just mentioned ports are drained.

When the valve is conditioned to produce D range, line pressure is supplied to only port 1a while the others remained drained. When in II range line pressure is supplied to ports 1a and 1b while ports 1c and 1d are drained. When the valve is conditioned for I range ports 1a– to 1c are supplied with line pressure while port 1d remains drained. However, when the manual valve is set in the R range position, only port 1d is pressurized while ports 1a–1c are drained.

In the instant embodiment the reverse clutch 20 and low and reverse brake 30 are circuited with port 1d of the manual valve via conduits 5, 6, and 7. A sequence valve 80 is interposed in the conduit which leads to the reverse clutch 20 in a manner to divide the same into first and second sections 7A and 7B This valve is arranged to be responsive to the pressure prevailing in conduit 6 which leads to the low and reverse clutch 30.

More specifically, the sequence valve 80 includes a spool 82 which is reciprocatively disposed in a bore 84 in a manner which defines a control chamber C at one end thereof. The spool 82 is provided with first and second lands 82A and 82B and is biased in a first direction which tends to reduce the volume of the control chamber C by a spring 86.

The bore 84 is formed with four ports 84a–84d. These ports respectively communicate with a first drain 85, conduit 7A, conduit 7B, a second drain 86 and a conduit 9. Port 84a is arranged to constantly communicate with the drain while the communication between ports 84b and 84c is controlled by the first land 82A. On the other hand, port 84d is arranged to constantly communicate with conduit 9 while the communication between ports 84b and 84c is controlled by the second land 82B. As will be clearly understood the pressure supplied into conduit 9 is fed directly into the control chamber C.

In operation, when the manual valve is conditioned for a range other than R range, conduits 5, 6 and 7 arc drained. Under these conditions no hydraulic pressure is supplied into the control chamber C by way conduit 9 and port 84d and the spool 82 assumes a first position (shown by the upper sectional half of the spool in FIG. 2) wherein land 82A closes port 84b and land 82B opens the drain port 82c. In this position the reverse clutch 20 and the low and reverse brake 30 are both drained.

However, when the manual valve is set to R and line pressure is supplied via port 1d into conduit 5, the pressure in conduit 6 rises and is supplied without delay to the low and reverse brake 30. Simultaneously, pressure is supplied through conduit 9 to port 84d and the control chamber C of the sequence valve 80. Upon the low and reverse brake becomming engaged to a predetermined degree the pressure in conduits 6 and 9 increases and is transmitted to the the control chamber C. When the pressure in the control chamber C reaches a level which overcomes the bias produced by spring 86, the spool moves to a second position illustrated by the lower section of the spool in FIG. 2). In this position land 82A assumes a position wherein communication between ports 84b and 84c is established while land 84a closes the drain port 84c.

With the sequence valve 80 in the latter mentioned condition, line pressure is then supplied to the reverse clutch via conduits 5, 7A and 7B.

Figure 1:
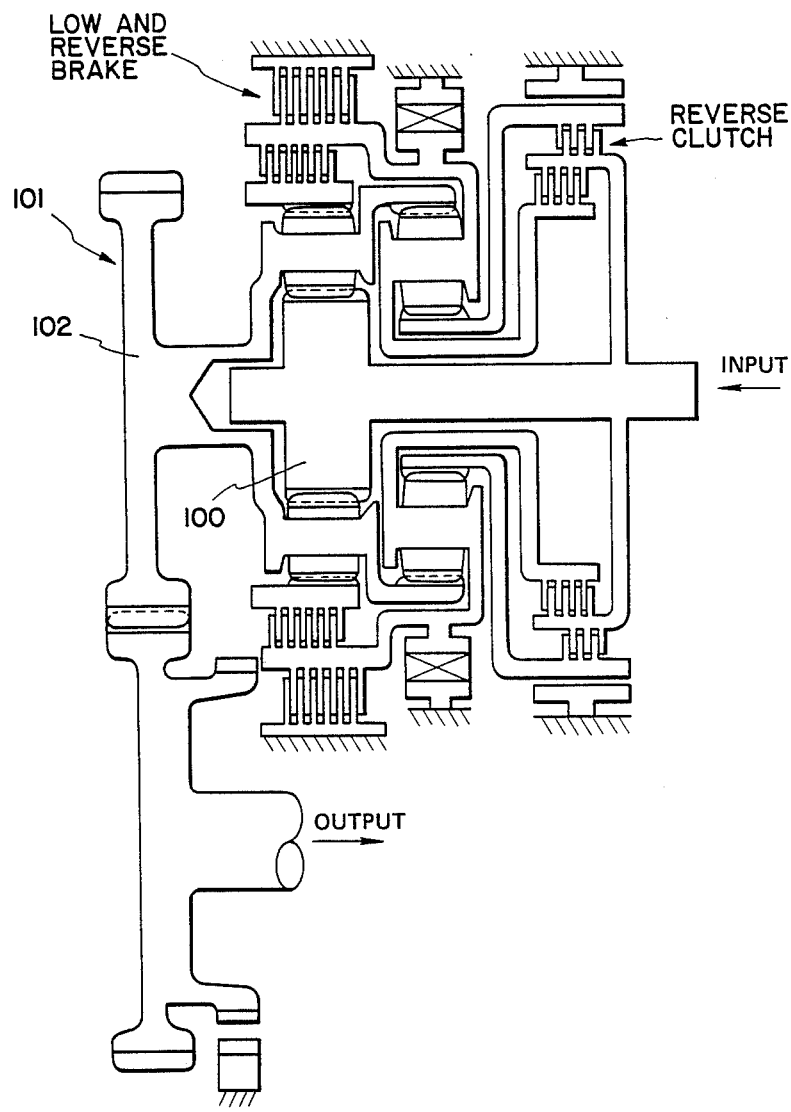
FIG. 1 shows the parts of the gear train discussed in the opening paragraphs of the instant disclosure which are involved in the generation of the double select shock problem.

Thus, as will be appreciated, as line pressure is permitted to preferentially be supplied to the low and reverse brake 30 before the reverse clutch 20 (the latter being supplied only after the sequence valve switches from its first to second positions) an engagement sequence of the two friction elements is provided which eliminates the double R range select shock problem. That is to say, as the low and reverse brake 30 is engaged before the reverse clutch 20, the carrier of the left hand planetary gear unit of FIG. 1 is prevented from being rotated before the engagement of the reverse clutch 20.

However, the engagement cannot be rendered totally shock free. Viz., as the carrier is rendered stationary, when the reverse clutch is engaged to establish a drive connection between the input shaft and the sun gear of the first planetary gear unit, a shock is produced.

It will thus be noted that while select shock is not completely eliminated, the annoying two sequential shocks are reduced to a single one.

For further details relating the construction and arrangement of the type of transmission to which the present invention is applied reference may be made to U.S. Pat. No. 4,602,529 issued on July 29, 1986 in the name of Sugano and to U.S. Pat. No. 4,561,528 issued on Dec. 31, 1985 also issued in the name of Sugano. The content of these references are hereby incorporated by reference thereto.

What is claimed is:

1. In a transmission
   a first hydraulically operated friction element;
   a second hydraulically operated friction element;
   a source of hydraulic pressure;
   a first valve interposed between said first and second friction elements and said source, said first valve being selectively conditionable to supply hydraulic pressure from said source to said first and second friction elements; and
   a sequence valve interposed between said second friction element and said first valve, said sequence valve being responsive to the level of pressure which is supplied to said first friction element in a manner wherein, until the pressure supplied to said first friction element reaches a predetermined level, said sequence valve assumes a condition wherein hydraulic pressure is cut-off from said second friction element and said second friction element is connected with a drain port formed in said sequence valve.

2. A transmission as claimed in claim 1 wherein said control chamber is so dimensioned that temporary attenuation of the pressure which is supplied to said first friction element is absent.

3. In a transmission
   a first hydraulically operated friction element;
   a second hydraulically operated friction element;
   a source of hydraulic pressure;
   a first valve interposed between said first and second friction elements and said source, said first valve being selectively conditionable to supply hydraulic pressure from said source to said first and second friction elements;
   a sequence valve interposed between said second friction element and said first valve, said sequence valve being responsive to the level of pressure which is supplied to said first friction element in a manner wherein, until the pressure supplied to said first friction element reaches a predetermined level, said sequence valve assumes a condition wherein hydraulic pressure is cut-off from said second friction element said sequence valve comprising:
   a spool reciprocatively disposed in a bore in a manner which defines a variable volume control chamber said spool having a first position wherein communication between said second friction element and said first valve is cut-off and said second friction element connected to a drain port formed in the bore, and a second position wherein communication between said drain port is cut-off and communication between said first valve and said second friction element is established; and
   a spring disposed in said bore and arranged to bias said spool toward said first position;
   said control chamber being fluidly communicated with said first friction element so as to be exposed to the pressure which is supplied thereto, the pressure prevailing in said control chamber producing a bias which tends to move said spool against the bias of said spring toward said second position.

4. In a transmission
   a first hydraulically operated friction element;
   a second hydraulically operated friction element;
   a source of hydraulic pressure;
   a first valve interposed between said first and second friction elements and said source, said first valve being selectively conditionable to supply hydraulic pressure from said source to said first and second friction element; and
   a sequence valve interposed between said second friction element and said first valve, said sequence valve being responsive to the level of pressure which is supplied to said first friction element in a manner wherein, until the pressure supplied to said first friction element reaches a predetermined level, said sequence valve assumes a condition wherein hydraulic pressure is cut-off from said second friction element and said second friction element is connected with a drain port formed in said sequence valve, said transmission being so constructed that when said first and second friction elements are both engaged, the transmission is conditioned to produce a predetermined gear ratio, said first friction element is arranged to brake the carrier of a planetary gear unit of the transmission, and said second friction element is arranged to selectively engage an input shaft of the transmission with a sun gear of the planetary gear unit.

5. A transmission as claimed in claim 4 wherein said predetermined gear ratio is a reverse gear.

6. In a transmission
a source of hydraulic fluid under pressure;
a first friction element, said first friction element communicating with said source by way of a conduit, said conduit being arranged to supply hydraulic fluid from said source into a servo chamber of said first friction element;
a first valve disposed in said conduit between said source and said first friction element, said first valve being selectively operable to permit hydraulic fluid to be supplied therethrough to said first friction element;
a second friction element;
a drain;
a sequence valve, said sequence valve having a valve element which is responsive to the pressure prevailing in said conduit and which cuts-off communication between said drain and said second friction element and establishes communication between said conduit and said second friction element when the pressure in said conduit assumes a predetermined level.

* * * * *